United States Patent
Vaknin et al.

(10) Patent No.: US 12,135,691 B1
(45) Date of Patent: Nov. 5, 2024

(54) SEARCHING FOR AND STORING DATA CHUNKS BASED OFF SIMILARITY

(71) Applicant: VAST DATA LTD., Tel Aviv (IL)

(72) Inventors: Yogev Vaknin, Tel Aviv (IL); Niko Farhi, Tel Aviv (IL); Asaf Levy, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 149 days.

(21) Appl. No.: 18/050,046

(22) Filed: Oct. 26, 2022

(51) Int. Cl.
  *G06F 16/174* (2019.01)
  *G06F 16/14* (2019.01)
  *G06F 16/16* (2019.01)

(52) U.S. Cl.
  CPC ........ *G06F 16/1744* (2019.01); *G06F 16/152* (2019.01); *G06F 16/164* (2019.01)

(58) Field of Classification Search
  None
  See application file for complete search history.

(56) References Cited

U.S. PATENT DOCUMENTS

| | | | |
|---|---|---|---|
| 8,954,399 B1* | 2/2015 | Balakrishnan | G06F 16/1752 707/692 |
| 2008/0263008 A1* | 10/2008 | Beyer | G06F 16/8365 |
| 2017/0123676 A1* | 5/2017 | Singhai | G06F 3/0608 |
| 2019/0379394 A1* | 12/2019 | Hallak | G06F 16/1744 |

* cited by examiner

*Primary Examiner* — Neveen Abel Jalil
*Assistant Examiner* — John J Morris
(74) *Attorney, Agent, or Firm* — Reches Patents

(57) ABSTRACT

A method for storing a received data chunk (DC) in a storage system, the method includes (a) obtaining a received fingerprint of the received DC, the received fingerprint may include received fingerprint elements that are indicative of occurrences, within the received DC, of content elements, the received fingerprint elements are ordered according to a given order; (b) searching, within a tree, for a similar stored fingerprint; the tree may include tree nodes that represent multiple stored fingerprints of stored data chunks that are stored in the storage system; different levels of the tree are allocated to different content elements; (c) compressing, when finding the similar stored fingerprint, the received DC based on a similar DC associated with the similar stored fingerprint, and updating storage system metadata to indicate that the received DC is stored in the storage system in a compressed form, and based on the similar stored DC.

25 Claims, 5 Drawing Sheets

SEARCHING FOR AND STORING DATA CHUNKS BASED OFF SIMILARITY

TECHNICAL FIELD

The present disclosure generally relates to the field of data storage, and more particularly to storing similar chunks in a storage system.

BACKGROUND

Storage systems are aimed to store vast amounts of data. Whenever a storage system receives a data chunk—it may be beneficial to compress the received data chunk based on a currently stored data chunk that is similar to the received data chunk.

The search for similar data chunks may be highly complicated and resource consuming—especially when the storage system stores vast numbers of data chunks. Performing one-to-one similarity checks between the received data chunk and all stored data chunks is impractical.

There is a growing need to provide an efficient solution for finding similar data chunks stored in a storage system and to store newly received data chunks in a compressed form, using similarity among data chunks—in order to improve the utilization of the storage system.

SUMMARY

There may be provide a storage system, a method and a non-transitory computer readable medium for storing similar chunks in a storage system.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
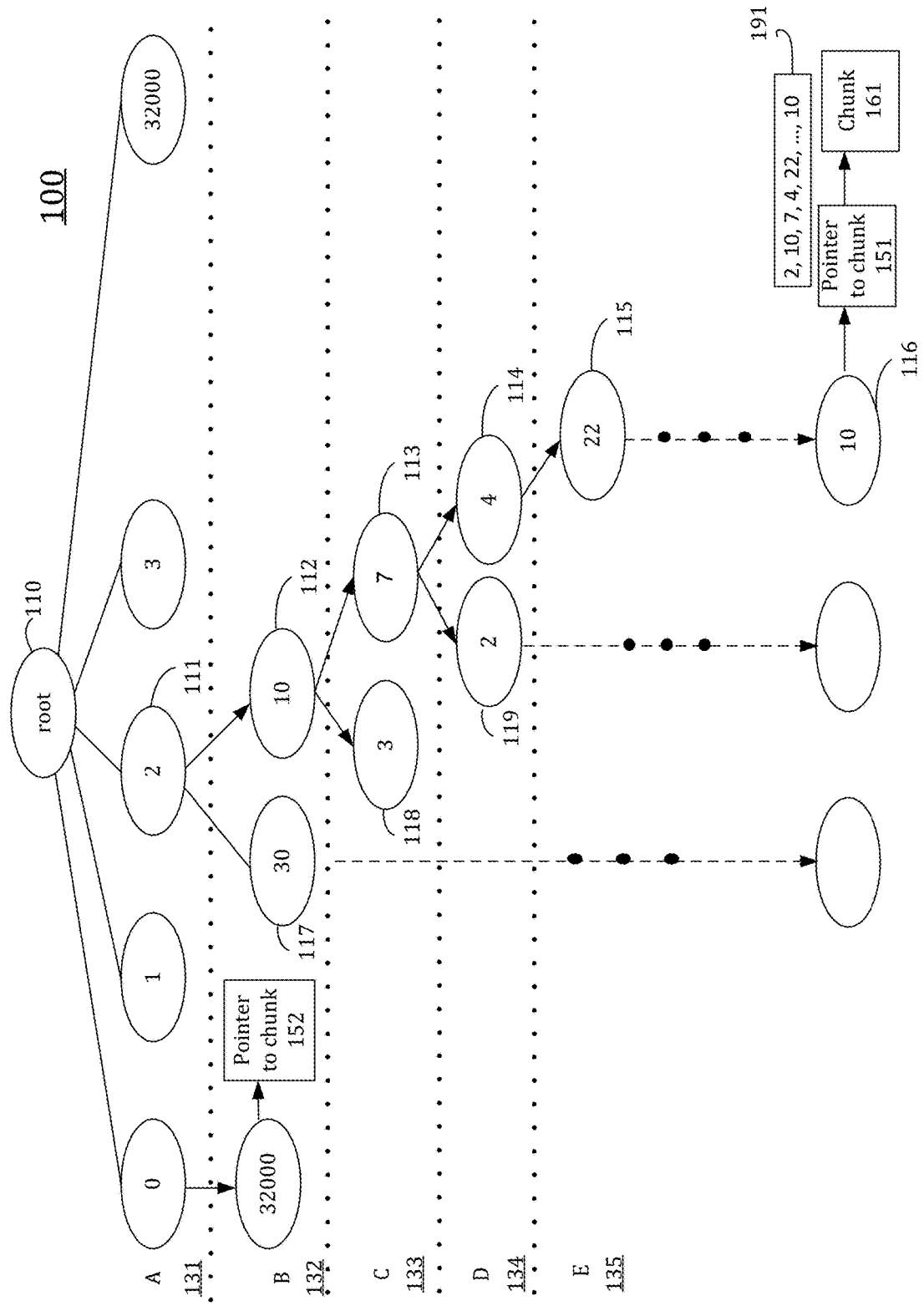
FIG. 1 is an example of a data structure for storing footprints of stored data chunks.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There are provided storage systems, methods, and non-transitory computer readable media for storing a received data chunk in a storage system.

The system includes scanning one or more trees to find similarity between one or more tree path that represent fingerprints of stored data chunks with a fingerprint that represents a received data chunk and performing comparisons between nodes of the path the received data chunk fingerprint. The method greatly simplifies the search after the similar data chunk as it based on scanning one or more trees and performing simple comparisons between fingerprint elements that are indicative of occurrences, within the received data chunk, of content elements. This method greatly reduced memory consumption, and computational consumption associated with performing more complex similarity calculations—especially when there are a vast number of stored data chunks.

Similarity hashes are calculated for obtaining fingerprints of data chunks stored in a storage system, and some of the fingerprints are catalogued in one or more trees, such as tree 100 of FIG. 1. Each level of the tree is allocated to one specific symbol, out of a set of symbols, that may appear in a data chunk, and the levels of a tree are descending according to a predefined order of a set of symbols, e.g., the alphabetic order of a set of ascii characters, a reversed order, or any other order.

Each data chunk is represented by a fingerprint that includes multiple portions, where each portion includes a weight, e.g., counter, for one symbol in the set of symbols. The order of the portions is according to the predefined order of the symbols in the set of symbols. For example, suppose the set of symbols is the set of characters: A, B, C, . . . Z, a fingerprint of a specific chunk may include the values: 5, 10, 7, 15, . . . —to indicate that the character A appears 5 times, B appears 10 times, C appears 7 times, D appears 15 times, etc.

In the following examples, it is assumed that the set of symbols is a set of alphabetic characters A-Z. A new fingerprint of a new chunk is added to the tree, by allocating each fingerprint portion to a node at one tree level. In FIG. 1, a fingerprint 191 that is composed of the values: [2, 10, 7, 4, 22, . . . , 10]—is catalogued in tree 100. The first level 131 under the root 110 is associated with the first character in the set of characters 'A'. Node 111 at level 131 is assigned to the first portion of fingerprint 191, with the value '2'. If there is already an existing node that includes the value '2' (representing another fingerprint), this node can be shared with the new fingerprint. At the second level 132 corresponding to the second character 'B', a node 112 that includes the value '10' is assigned to the second portion of the new fingerprint, and is pointed by the first level node 111. The same continues with a node 113 at level 133 that stores the value '7' and associated with the character 'C', a node 114 at level 134 that stores the value '4' and associated with the character 'D', a node 115 at level 135 that stores the value '22' and associated with the character 'E', and a node 116 at the last level that stores the value '10' and associated with the character 'Z'.

The leaf at the end of the path from the root to the bottom of the tree includes a pointer to the data chunk associated with the path. For example, leaf 151 includes a pointer to data chunk 161 that is associated with fingerprint 191. A leaf may not be located under the last level (corresponding to the last character) of the tree. For example, leaf 152 is located under the second level, since it represents a footprint that describes a chunk that includes 32000 characters, all being the character 'B'. Since the first level (=0) and the second level sum to 32000, which is the total number of characters of the chunk, there is no need to add nodes for the entire path (all zeros).

Different fingerprints may share part of the nodes at the upper layers of the tree. For example, node 111 is shared between fingerprint 191 and another fingerprint that starts with a portion having the value '2', but splits under node 111 to node 117 of the value 30. Both nodes 111 and 112 are shared between fingerprint 191 and another fingerprint that split to node 118 under node 112. Nodes 111, 112 and 113 are shared between fingerprint 191 and another fingerprint that split to node 119 under node 113.

When a new data chunk is needed to be stored in the storage system, its fingerprint is calculated according to the content of the data chunk, and according to the predefined order of the set of symbols, wherein the first portion of the fingerprint is indicative of the count of the first symbol according to the predefined order of the set, wherein the count is the number of appearances of the first symbol in the chunk, the second portion of the fingerprint is indicative of the count of the second symbol, etc.

The tree is then traversed for looking up a similar data chunk having a similar fingerprint. The traversing of the tree continues as long as the followed path includes nodes having the same values as the corresponding portions of the new fingerprint. For example, suppose the new fingerprint includes the values [2, 10, 7, 4, 22, . . . , 10]—the tree traversing, for looking up the new fingerprint, follows nodes 111 . . . 116 and reaches the leaf 151 that stores a pointer to a chunk that has the same fingerprint, and therefore this chunk is similar (or identical) to the new chunk.

In this case the content of the new chunk will not be stored in its entirety, but will rather be compressed against chunk 161 to provide a delta, i.e., a difference in content that is not shared between the two chunks. Only the delta and a pointer to the stored (reference) chunk will be stored for the new chunk. The pointer has the same value as the value in leaf 151 that includes a pointer to chunk 161 that now serves as a reference chunk to the new chunk. The new chunk is not catalogued in tree 100, since its reference chunk 161 represents its fingerprint in addition to the majority of its content.

Figure 5:
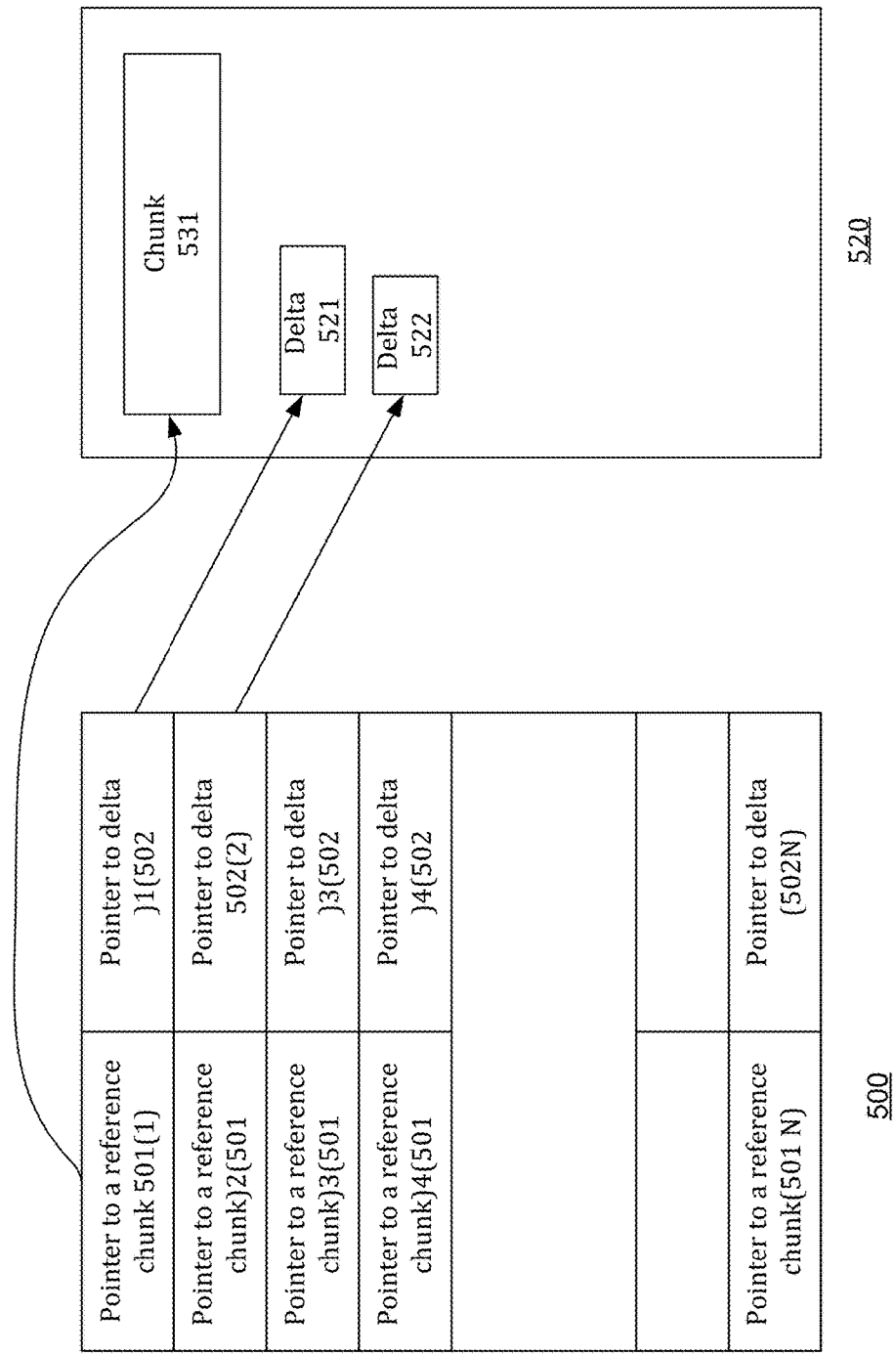
FIG. 5 is an example of a chunk and deltas.

Data chunks that are found to be similar to other chunks, when traversing the tree, are catalogued in a similar chunk metadata, such as table 500 of FIG. 5, where each entry corresponds to one chunk that depends on a similar (reference) chunk, and includes a pointer to the corresponding reference chunk, such as pointers 501(1)-501(N), and a pointer to the delta portion resulted from the delta compression, such as pointers 502(1)-502(N). The delta portion is stored in one of the storage devices 520 of the system, such as delta portions 521 and 522, pointed by pointers 502(1) and 502(2), respectively. It is noted the size of the delta portions may be much smaller than the full size occupied by reference chunks, such as chunk 531.

It may be determined to regard a followed path of a fingerprint as a similar fingerprint even if the traverse did not result 100% match of the encountered nodes. If at least a certain percentage of the nodes along the path are matched—it may be determined that the fingerprints match and the chunk associated with the followed path is considered as a chunk that can be used as a reference chunk. This approach can be used, when the first portions of the fingerprints match and the second portions do not much.

Non-matching portions between two fingerprints may be in the middle of the path along the tree. In this case, where part of the tree was traversed, and matches were detected between the corresponding new footprint's portions and the traversed nodes, after which a non-matching node is encountered, there may be an attempt to follow at least part of the subsequent nodes that do not match, for a case where the matching resumes after several nodes. For example, the fingerprint [10, 2, 3, 5, 8, 21, . . . , 100] and the fingerprint [10, 2, 3, 4, 3, 21, . . . , 100] may still relate to similar chunks, even if some of the middle portions do not match.

When a mismatch is encountered after a series of matching nodes, the most probable path, descending from the non-matching node, is selected for continuing checking whether the matching will resume at lower nodes. There may be a need to select the most probable path, i.e., the path that has more chances for similarity. One or more paths that continue with nodes having values that are closest to the looked-up value are selected, and one or more traverses are performed along the one or more paths to detect a resumed matching.

For example, suppose nodes 111-113 are found to have matching values during a traverse, and then a node having a value '6' is looked up, where the existing nodes 119 and 114 have the values '2' and '4'. It may be determined that the path that continues with node 114 is the most suitable path to check resuming of the matching, since the value '4' is the closest to '6'. It may be otherwise determined to check the closest nodes having a value difference of less than a certain difference, e.g., a difference of '4' or below. In the latter case, the path that continues with node 114 and the path that continues with node 119—are both traversed for checking whether the matching resumes.

The decision to check if the matching resumes at lower nodes may depend on the number or the percentage (of the total number of nodes in the path) of matching nodes that have been found so far. The decision may further depend on the sum of the values of the matching nodes that were encountered. For example, if a chunk includes 32,000 characters, then the sum of all counters in the footprint should sum to 32,000. If the sum of the encountered nodes along the followed path is e.g., 20,000, then it can be determined that a major part of the content of the chunk is covered by the encountered nodes, and there is a potential high similarity that may be further examined.

Non-matching portions between two fingerprints may be at the start of the fingerprints, and therefore the traversing of the tree will not be initiated, because no matching node is found under the root. According to an embodiment of the invention, more than one tree is maintained for cataloging the same fingerprints in different orders of the fingerprints' portions, wherein each tree is associated with a different order of symbols of the set of symbols.

Figure 2:
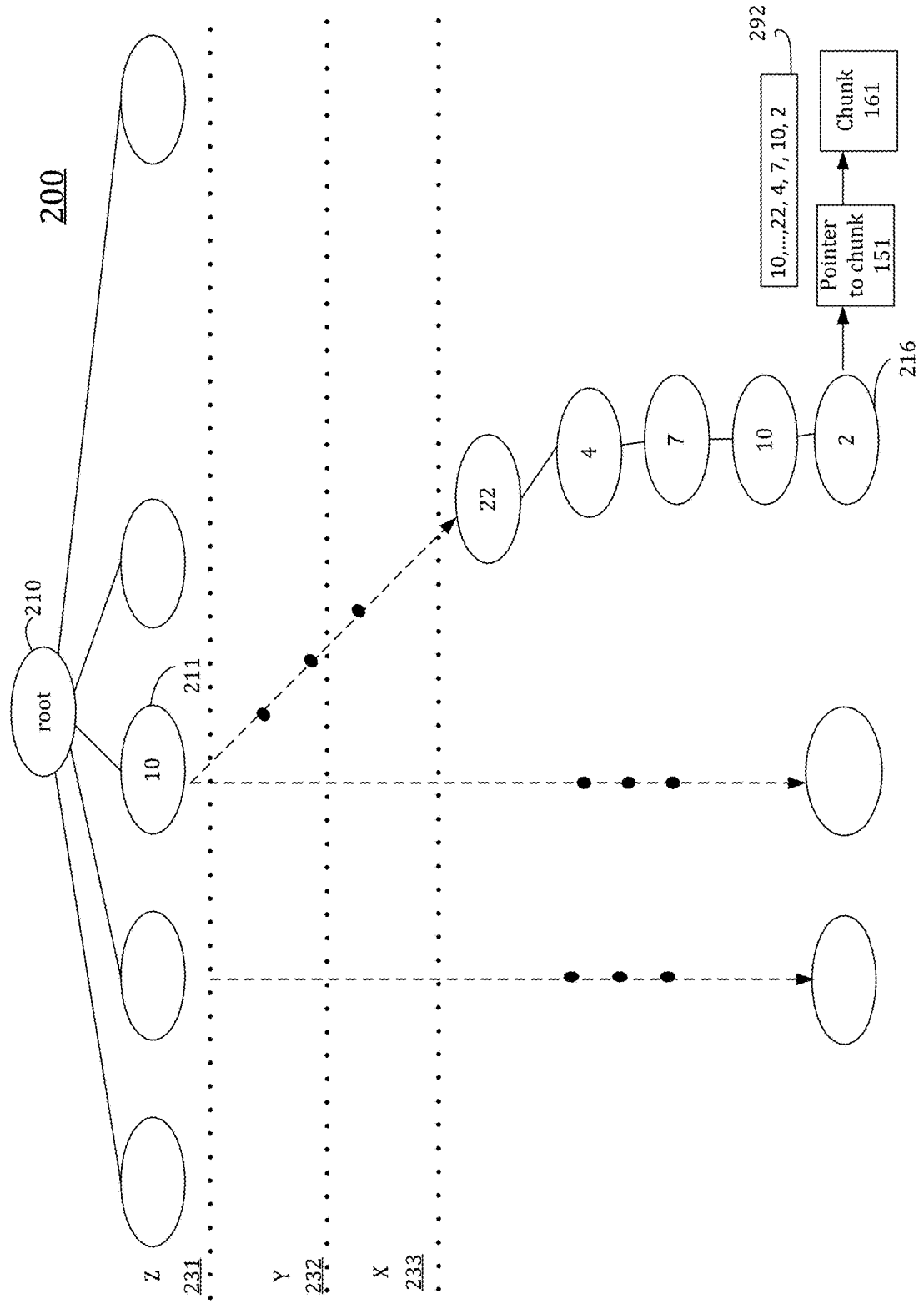
FIG. 2 is an example of a data structure for storing footprints of stored data chunks.

A second tree, such as tree 200 of FIG. 2, may be used to catalogue fingerprints in the reverse order of the set of symbols, and the second fingerprints are also arranged in the reversed order of the set of symbols. For example, a second footprint 292 of chunk 161 is in the reverse order of footprint 192. The first level 231 of tree 200 is associated with the last symbol in the set of symbols, in this example—the character 'Z'. The order is descending when traversing the tree towards the bottom, for example, the second level 232 corresponds to the character 'Y', and the third level 233 corresponds to the character 'X'. Second footprint 292 is catalogued in the reversed order comparing its cataloging in tree 100. For example, the last value in tree 100 along the path of footprint 192 is '10, where the same value is catalogued in tree 200 at the first level 231, while the first value '2' that was catalogued at the first level of tree 100 is catalogued in the lowest node 216 in tree 200.

Suppose a new fingerprint that includes the portion values: [0, 0, 0, 4, 22, . . . , 10] is looked up in tree 100. The lookup will result no similar footprints, while a lookup in tree 200 will determine that this new fingerprint is similar to fingerprint 292 and therefor the new chunk is similar to chunk 161.

A third tree may be maintained for cataloging in a different order, for example—middle first, where the first symbols in the fingerprints and in the trees are those starting from the middle of the set of symbols, and when reaching the last symbol, the fingerprint continues from the start until the middle of the set. Any other order may be applied to one or more other trees.

Several order combinations of a new fingerprint of a new chunk may be looked up in the corresponding trees for fast determination of matching paths. For example, the tree whose first nodes match the corresponding fingerprint will be traversed.

Different trees may have levels ordered at different manners—to provide different permutations. For example—referring to the tree 100 of FIG. 1—that includes twenty six levels allocated to A, B, C, D, E, F, G, H, I, J, K, L, M, N, O, P, Q, R, S, T, U, V, W, X, Y, Z—then other trees may also include twenty six levels (allocated to A till Z)— but ordered in any other order—for example—each one of A-Z may be associated with the first till twenty-sixth levels of a tree.

When a lookup in all the trees does not detect a similar footprint, the new fingerprint is catalogued in all the trees according to the predefined order of each tree.

Figure 3:
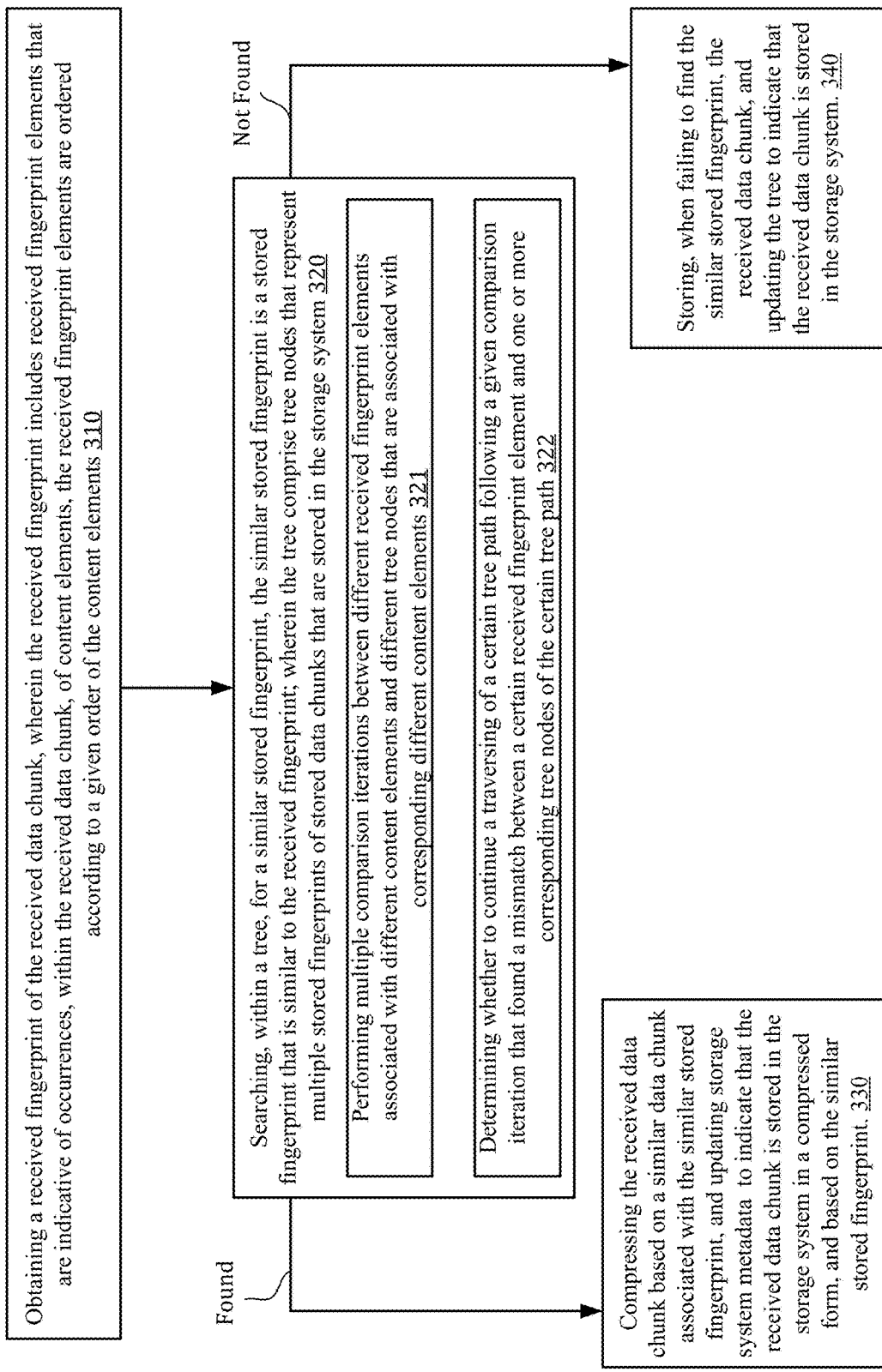
FIG. 3 is an example of a method.

FIG. 3 illustrates an example of method 300 for storing a received data chunk in a storage system.

Method 300 may start by step 310 of obtaining a received fingerprint of the received data chunk, wherein the received fingerprint includes received fingerprint elements (e.g., the fingerprint portions) that are indicative of occurrences, within the received data chunk, of content elements, the received fingerprint elements are ordered according to a given order of the content elements. The obtaining may include receiving or generating.

The occurrences may include the number of appearances corresponding to content elements in the data chunk, the frequency of appearances (number of appearances divided by the total number of elements per data chunk), and the like.

Step 310 may be followed by step 320 of searching, within a tree, for a similar stored fingerprint, the similar stored fingerprint is a stored fingerprint that is similar to the received fingerprint; wherein the tree comprises tree nodes that represent multiple stored fingerprints of stored data chunks that are stored in the storage system. Different levels of the tree are allocated to different content elements. For example—see tree 100 of FIG. 1—different levels are allocated to different content elements of A to Z. A stored fingerprint is similar to the received fingerprint when a certain portion of their corresponding fingerprint elements match (equal or the difference between corresponding fingerprint elements is below a certain threshold), for example, a certain percentage (e.g., at least 50%, 70%, etc.) or a certain number of matched fingerprint elements.

Step 320 may be followed by step 330 of compressing, when finding the similar stored fingerprint, the received data chunk based on a similar data chunk associated with the similar stored fingerprint, and updating storage system metadata to indicate that the received data chunk is stored in the storage system in a compressed form, and based on the similar stored data chunk. The storage system metadata may be table 500 of FIG. 5.

Step 320 may be followed by step 340 of storing, when failing to find the similar stored fingerprint, the received data chunk, and updating the tree to indicate that the received data chunk is stored in the storage system. The updating of the tree may include adding the fingerprint of the received data chunk, for example, in a similar manner of the path associated with fingerprint 191 of FIG. 1.

Step 320 may include step 321 of performing multiple comparison iterations between different received fingerprint elements associated with different content elements and different tree nodes that are associated with corresponding different content elements.

Step 321 may include step 322 of determining whether to continue a traversing of a certain tree path following a given comparison iteration that founds a mismatch between a certain received fingerprint element and one or more corresponding tree nodes of the certain tree path. For example—referring to FIG. 1—succeeding in the comparisons of levels A, B and C and then failing to find a match in level D. If three consecutive successful comparison iterations may tolerate a mismatch in level D—then step 320 may continue to search matches in level D and below.

Step 322 may be based on comparison results of comparison iterations that preceded the given comparison iteration. For example—the number of successful comparison iterations and the number of failed comparison iterations and/or the order of successful or failed comparison iterations. Any rule may be applied to determine the outcome of step 320. For example—a rule may require at least 2 or 3 (or any predetermined numbers) of successful comparison iterations before allowing a failed comparison iteration.

The one or more corresponding tree nodes belongs to a certain level in the tree along the certain tree path. Step 322 may include selecting a corresponding tree node of the one or more corresponding tree nodes, that best fits the certain received fingerprint element—and this best fit may provide a start point of a next comparison iteration based on the corresponding tree node. For example—assuming that the comparison iterations of levels A, B and C were successful—but in level D the value of the fingerprint is not found under the followed path of matched results (e.g., 111-112-113)—then the search may continue from node 114 or 119 under the mismatched node. A corresponding tree node that best fits the certain received fingerprint element may be a tree node (under the mismatched node) that includes a value that is closest to the value of the certain received fingerprint element or differs by less than a certain threshold value.

The similar stored fingerprint may be equal to the received fingerprint. In this case the storage system may not store the received fingerprint—but may store metadata pointing to (for allowing retrieval of) the similar stored fingerprint.

The similar stored fingerprint may differ from the received fingerprint by up at least one allowed mismatch tree node. Each mismatch tree node may have a value that differs from a value of a corresponding received fingerprint element.

Step 322 may include determining whether a mismatch tree node is an allowed mismatch node based on outcomes of comparison iterations that preceded a comparison iteration that compared the mismatch tree node to a corresponding received fingerprint element.

The content elements may be symbols—for example alphanumeric symbols, text letters, numbers, ascii characters, other symbols, a sequence of characters or a sequence of any other type of symbols, and the like.

Step 320 may include searching the similar stored fingerprint within multiple trees, wherein the multiple trees differ from each other by a mapping between tree levels and content elements. As indicated above—in relation to FIGS. 1 and 2 that illustrate tree 100 that has levels ordered from A to Z, while tree 200 has levels that are ordered in the opposite order (from Z to A).

The multiple trees comprise a first tree that has first tree levels that are ordered according to the given order and a second tree that is has second tree levels that are ordered according to a second order that differs from the given order—for example may be the opposite order, or may differ by any manner from the given order.

Figure 4:
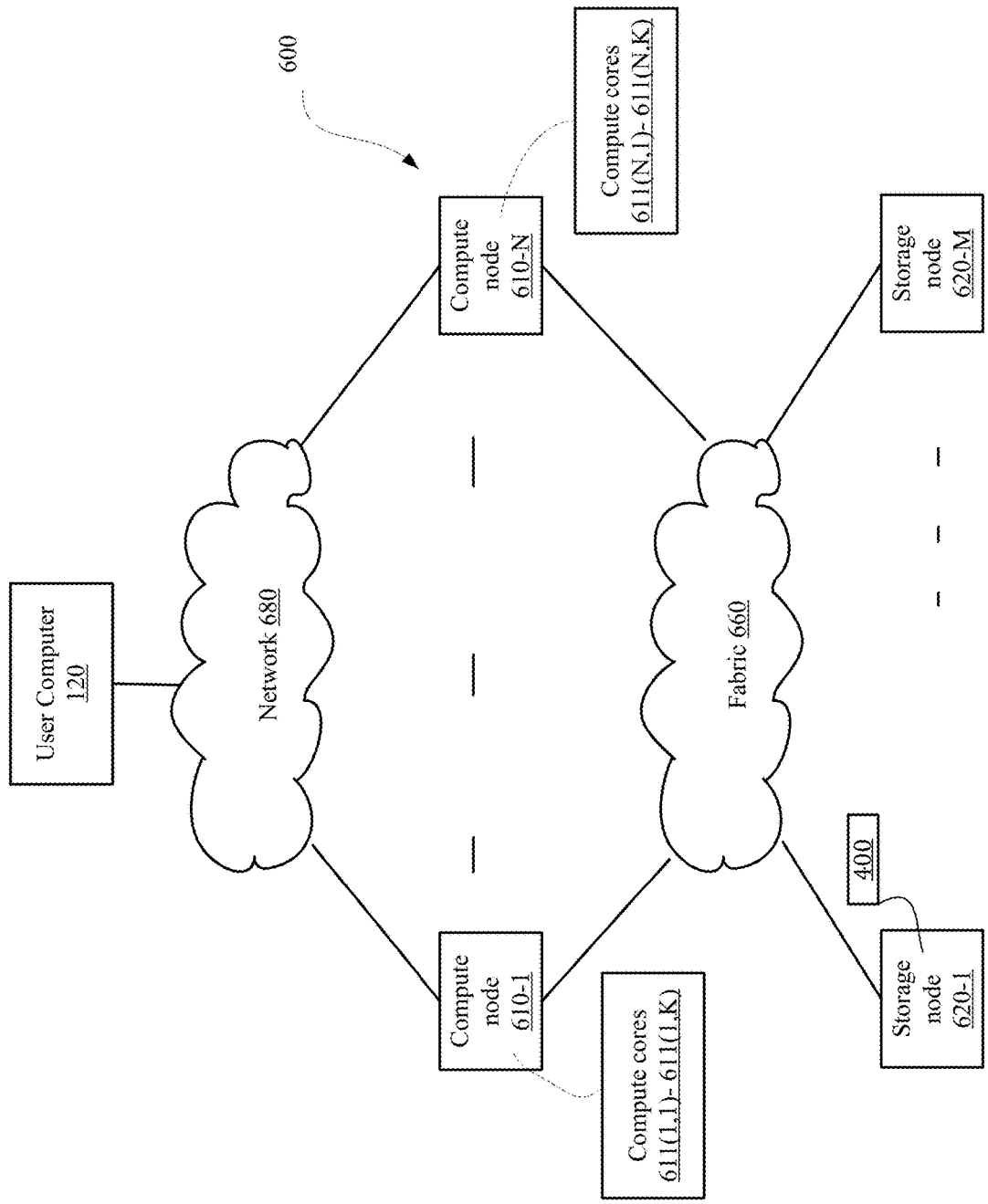
FIG. 4 is an example of a storage system and its environment.

FIG. 4 illustrates an example of a storage system and its environment.

For simplicity of explanation other storage systems are not shown and may have a similar structure.

The storage system 600 includes a number of N compute nodes 610-1 through 610-N (hereinafter referred to individually as a compute node 610 and collectively as compute nodes 610, merely for simplicity purposes, N is an integer equal to or greater than 1). The compute nodes include (or may execute) multiple compute cores each (for example 611(1,1)-611(1,K) of compute node 610-1 and 611(N,1)-611(N,K) of compute node 610-N).

The storage system 600 also includes a number of M storage nodes 620-1 through 620-M (hereinafter referred to individually as a storage node 620 and collectively as storage nodes 620, merely for simplicity purposes, M is an integer equal to or greater than 1). The computer nodes 610 and the storage nodes 620 are connected through a communication fabric 660. M may equal N or may differ from N. One or more of the compute nodes and/or one or more compute cores of at least one compute core may control the execution of Method 300. The trees illustrated in FIGS. 1 and 2, table 500, the deltas and the chunks may be stored in any of the storage devices included in storage nodes 620.

In an embodiment, a compute node 610 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 610 does not require any dedicated hardware.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for storing a received data chunk in a storage system, the method comprises:

obtaining a received fingerprint of the received data chunk, wherein the received fingerprint comprises received fingerprint elements that are associated with content elements of the received data chunk, and wherein each of the received fingerprint elements is indicative of a number of occurrences, within the received data chunk, of an associated content element of the received data chunk elements, wherein the received fingerprint elements are ordered within the received fingerprint, according to a given order of the content elements;

searching, within a tree, for a similar stored fingerprint, the similar stored fingerprint is a stored fingerprint that is similar to the received fingerprint; wherein the tree comprise tree nodes that represent multiple stored fingerprints of stored data chunks that are stored in the storage system; wherein different levels of the tree are allocated to different content elements, wherein each level of the tree is allocated to a specific content element, out of a set of content elements that may appear in a data chunk;

compressing, when finding the similar stored fingerprint, the received data chunk based on a similar data chunk associated with the similar stored fingerprint, and updating storage system metadata to indicate that the received data chunk is stored in the storage system in a compressed form, and based on the similar stored data chunk;

wherein the updating the storage system metadata comprises updating a metadata table with an entry corresponding to the received data chunk that depends on the similar data chunk, a pointer to the corresponding similar data chunk, and a pointer to a delta portion resulting from the compression; and storing, when failing to find the similar stored fingerprint, the received data chunk, and updating the tree to indicate that the received data chunk is stored in the storage system.

2. The method according to claim 1, wherein the searching comprises performing multiple comparison iterations between different received fingerprint elements associated with different content elements and different tree nodes that are associated with corresponding different content elements.

3. The method according to claim 2, comprising determining whether to continue a traversing of a certain tree path following a given comparison iteration that found a mismatch between a certain received fingerprint element and one or more corresponding tree nodes of the certain tree path.

4. The method according to claim 3, wherein the determining is based on comparison results of comparison iterations that preceded the given comparison iteration.

5. The method according to claim 3, wherein the one or more corresponding tree nodes belong to a certain level in the tree along the certain tree path; wherein the method comprises selecting a corresponding tree node of the one or more corresponding tree nodes, that best fits the certain received fingerprint element; and determining a start point of a next comparison iteration based on the corresponding tree node.

6. The method according to claim 2, wherein the similar stored fingerprint equals the received fingerprint.

7. The method according to claim 2, wherein the similar stored fingerprint differs from the received fingerprint by up at least one allowed mismatch tree node, wherein each mismatch tree node has a value that differs from a value of a corresponding received fingerprint element.

8. The method according to claim 7, comprising determining whether a mismatch tree node is an allowed mismatch node based on outcomes of comparison iterations that preceded a comparison iteration that compared the mismatch tree node to a corresponding received fingerprint element.

9. The method according to claim 1, wherein the content elements are symbols.

10. The method according to claim 1 comprising searching the similar stored fingerprint within multiple trees, wherein the multiple trees differ from each other by a mapping between tree levels and content elements.

11. The method according to claim 10 wherein the multiple trees comprise a first tree that has first tree levels that are ordered according to the given order and a second tree that is has second tree levels that are ordered according to an order that differs from the given order.

12. The method according to claim 10 wherein the multiple trees comprise a first tree that has first tree levels that are ordered according to the given order and a second tree that is has second tree levels that are ordered according to an order that is opposite to the given order.

13. A non-transitory computer readable medium for storing a received data chunk in a storage system, the non-transitory computer readable medium stores instructions that once executed by a source storage unit (SSS) cause the SSS to:
- obtain a received fingerprint of the received data chunk, wherein the received fingerprint comprises received fingerprint elements that are associated with content elements of the received data chunk, and wherein each of the received fingerprint elements is indicative of a number of occurrences, within the received data chunk, of an associated content elements element of the received data chunk, wherein the received fingerprint elements are ordered within the received fingerprint, according to a given order of the content elements;
- search, within a tree, for a similar stored fingerprint, the similar stored fingerprint is a stored fingerprint that is similar to the received fingerprint; wherein the tree comprise tree nodes that represent multiple stored fingerprints of stored data chunks that are stored in the storage system; wherein different levels of the tree are allocated to different content elements, wherein each level of the tree is allocated to a specific content element, out of a set of content elements that may appear in a data chunk;
- compress, when finding the similar stored fingerprint, the received data chunk based on a similar data chunk associated with the similar stored fingerprint, and updating storage system metadata to indicate that the received data chunk is stored in the storage system in a compressed form, and based on the similar stored data chunk;
- wherein the updating the storage system metadata comprises updating a metadata table with an entry corresponding to the received data chunk that depends on the similar data chunk, a pointer to the corresponding similar data chunk, and a pointer to a delta portion resulting from the compression; and
- store, when failing to find the similar stored fingerprint, the received data chunk, and updating the tree to indicate that the received data chunk is stored in the storage system.

14. The non-transitory computer readable medium according to claim 13, wherein the searching comprises performing multiple comparison iterations between different received fingerprint elements associated with different content elements and different tree nodes that are associated with corresponding different content elements.

15. The non-transitory computer readable medium according to claim 14, that stores instructions for determining whether to continue a traversing of a certain tree path following a given comparison iteration that found a mismatch between a certain received fingerprint element and one or more corresponding tree nodes of the certain tree path.

16. The non-transitory computer readable medium according to claim 15, wherein the determining is based on comparison results of comparison iterations that preceded the given comparison iteration.

17. The non-transitory computer readable medium according to claim 15, wherein the one or more corresponding tree nodes belong to a certain level in the tree along the certain tree path; wherein the method comprises selecting a corresponding tree node of the one or more corresponding tree nodes, that best fits the certain received fingerprint element; and determining a start point of a next comparison iteration based on the corresponding tree node.

18. The non-transitory computer readable medium according to claim 14, wherein the similar stored fingerprint equals the received fingerprint.

19. The non-transitory computer readable medium according to claim 14, wherein the similar stored fingerprint differs from the received fingerprint by up at least one allowed mismatch tree node, wherein each mismatch tree node has a value that differs from a value of a corresponding received fingerprint element.

20. The non-transitory computer readable medium according to claim 19, that stores instructions for determining whether a mismatch tree node is an allowed mismatch node based on outcomes of comparison iterations that preceded a comparison iteration that compared the mismatch tree node to a corresponding received fingerprint element.

21. The non-transitory computer readable medium according to claim 13, wherein the content elements are symbols.

22. The non-transitory computer readable medium according to claim 13, that stores instructions for searching the similar stored fingerprint within multiple trees, wherein the multiple trees differ from each other by a mapping between tree levels and content elements.

23. The non-transitory computer readable medium according to claim 22, wherein the multiple trees comprise a first tree that has first tree levels that are ordered according to the given order and a second tree that is has second tree levels that are ordered according to an order that differs from the given order.

24. The non-transitory computer readable medium according to claim 22, wherein the multiple trees comprise a first tree that has first tree levels that are ordered according to the given order and a second tree that is has second tree levels that are ordered according to an order that is opposite to the given order.

25. A storage system comprising storage units and a processing circuit, wherein the processing circuit is configured to:
- obtain a received fingerprint of the received data chunk, wherein the received fingerprint comprises received fingerprint elements that are associated with content elements of the received data chunk, and wherein each of the received fingerprint elements is indicative of a number of occurrences, within the received data chunk, of an associated content elements element of the received data chunk, wherein the received fingerprint elements are ordered within the received fingerprint, according to a given order of the content elements;

search, within a tree, for a similar stored fingerprint, the similar stored fingerprint is a stored fingerprint that is similar to the received fingerprint; wherein the tree comprise tree nodes that represent multiple stored fingerprints of stored data chunks that are stored in the storage system; wherein different levels of the tree are allocated to different content elements, wherein each level of the tree is allocated to a specific content element, out of a set of content elements that may appear in a data chunk;

compress, when finding the similar stored fingerprint, the received data chunk based on a similar data chunk associated with the similar stored fingerprint, and updating storage system metadata to indicate that the received data chunk is stored in the storage system in a compressed form, and based on the similar stored data chunk;

wherein the updating the storage system metadata comprises updating a metadata table with an entry corresponding to the received data chunk that depends on the similar data chunk, a pointer to the corresponding similar data chunk, and a pointer to a delta portion resulting from the compression; and store, when failing to find the similar stored fingerprint, the received data chunk, and updating the tree to indicate that the received data chunk is stored in the storage system.

\* \* \* \* \*